United States Patent [19]
Wang

[11] 4,342,039
[45] Jul. 27, 1982

[54] HIGH RESOLUTION MAGNETIC PRINTING HEAD

[75] Inventor: Jish M. Wang, Schenectady, N.Y.

[73] Assignee: General Electric Company, Schenectady, N.Y.

[21] Appl. No.: 227,863

[22] Filed: Jan. 23, 1981

Related U.S. Application Data

[63] Continuation-in-part of Ser. No. 69,833, Aug. 27, 1979, abandoned.

[51] Int. Cl.³ .............................................. G06F 3/14
[52] U.S. Cl. ................................................... 346/74.5
[58] Field of Search ..................... 346/74.1, 74.5, 74.2; 360/122–125, 110, 121

[56] References Cited

U.S. PATENT DOCUMENTS 3,553,716  1/1971  Anderson et al. .................. 360/125
3,986,210  10/1976  Sugaya et al. ....................... 360/123
4,097,871  1/1978  Berkowitz et al. ................ 364/74.5
4,198,667  4/1980  Lazzari et al. .................. 360/125 X
4,257,051  3/1981  Lindsay et al. .................... 346/74.5

*Primary Examiner*—Aristotelis M. Psitos
*Attorney, Agent, or Firm*—Alexander M. Gerasimow; James C. Davis, Jr.; Marvin Snyder

[57] ABSTRACT

In order to achieve higher resolution in printed data, separate magnetic printing head sub-assemblies are adjacently disposed with respect to each other. Each sub-assembly includes a high permeability magnetic comb structure with teeth protruding through elongated slots in a pair of flexible printed circuit boards. High resolution is achieved by a relative offset of the comb teeth so that the teeth of the comb in the second sub-assembly align with the gaps in between the comb teeth in the first sub-assembly.

8 Claims, 17 Drawing Figures

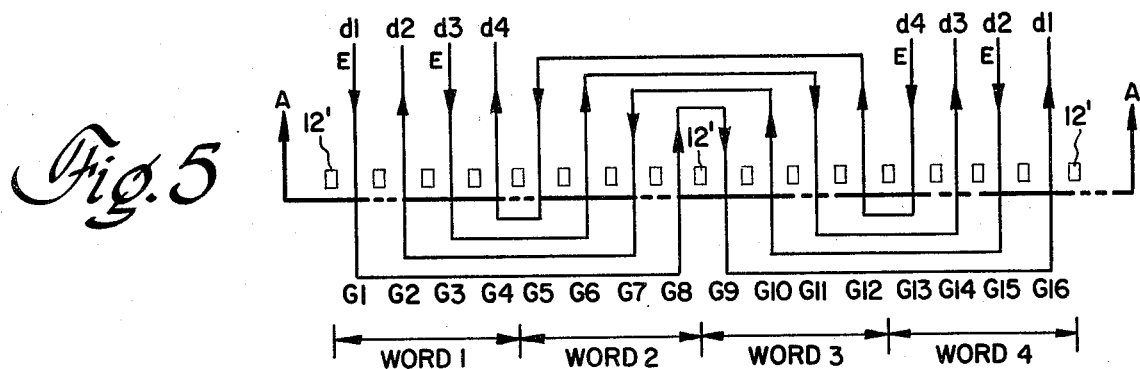
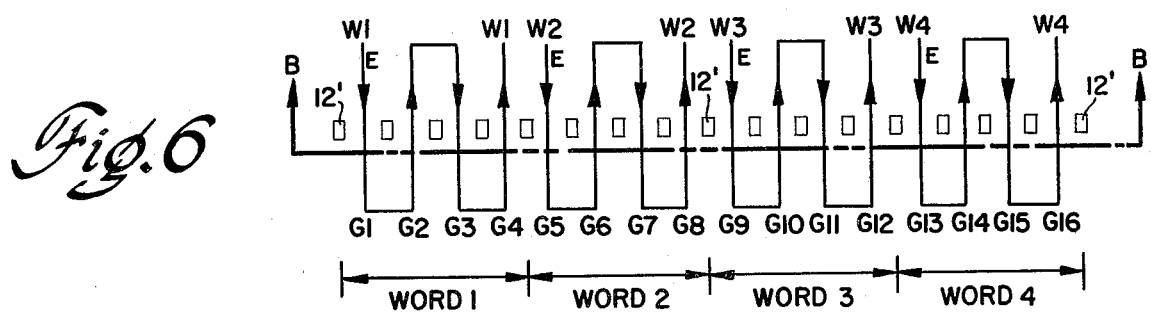
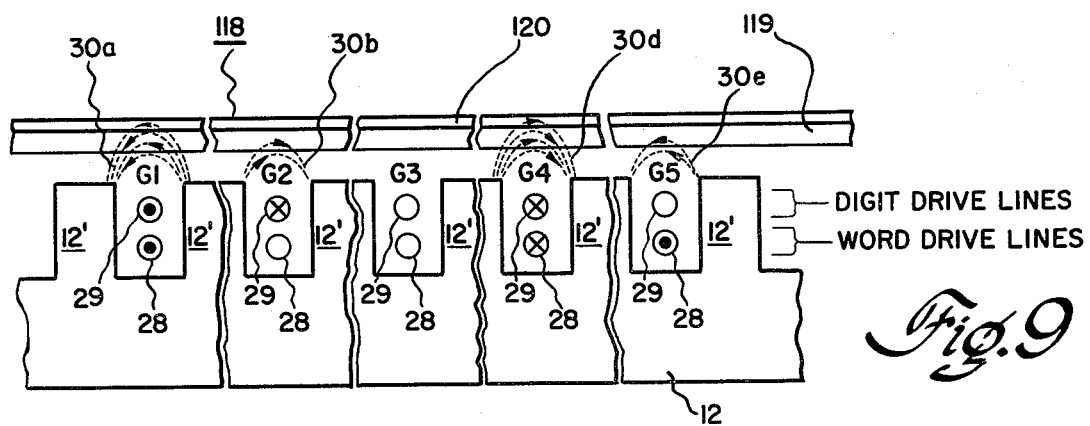

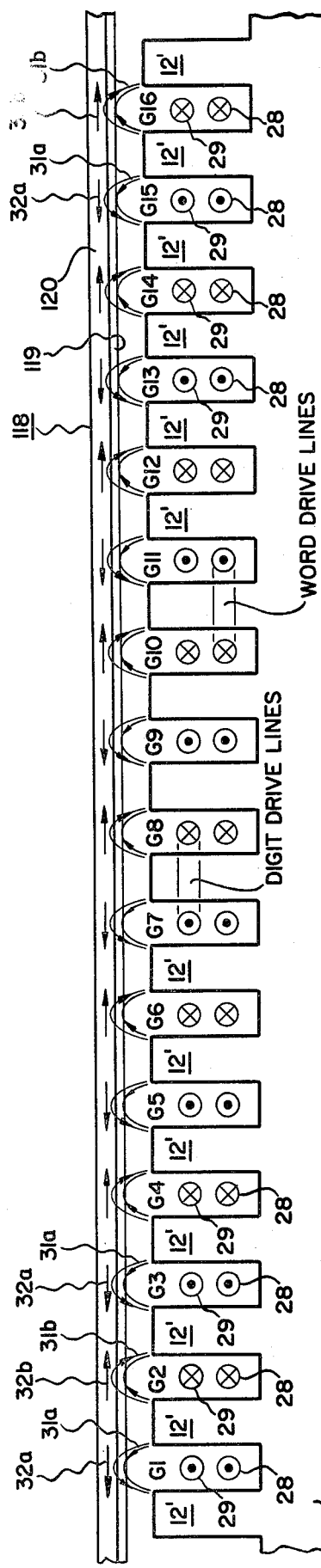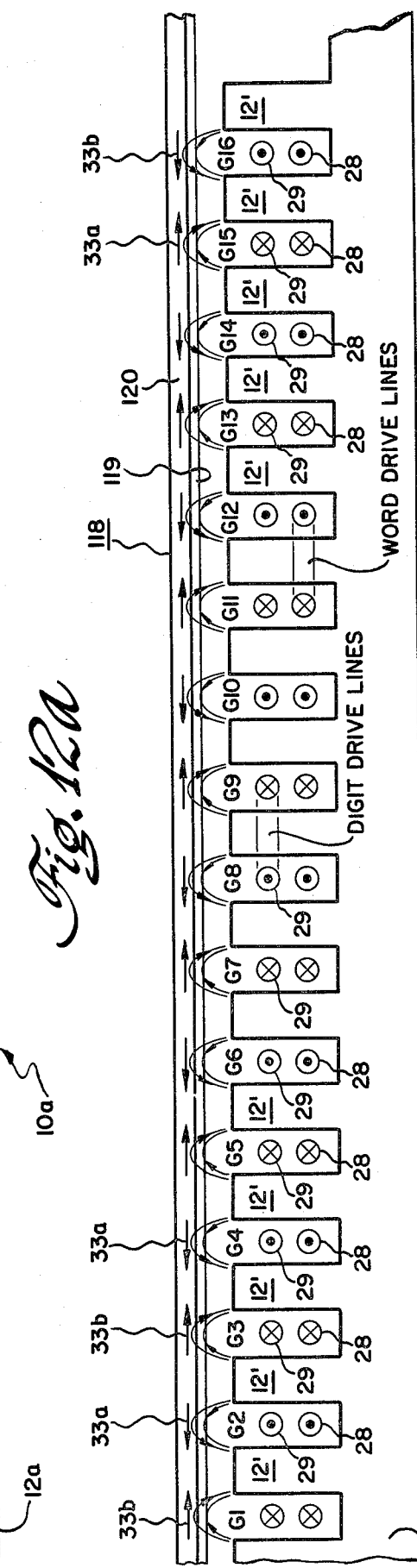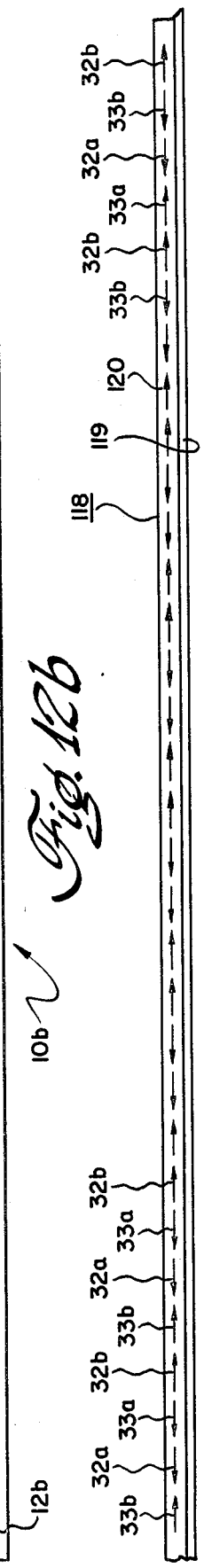
Fig. 12a
Fig. 12b
Fig. 12c

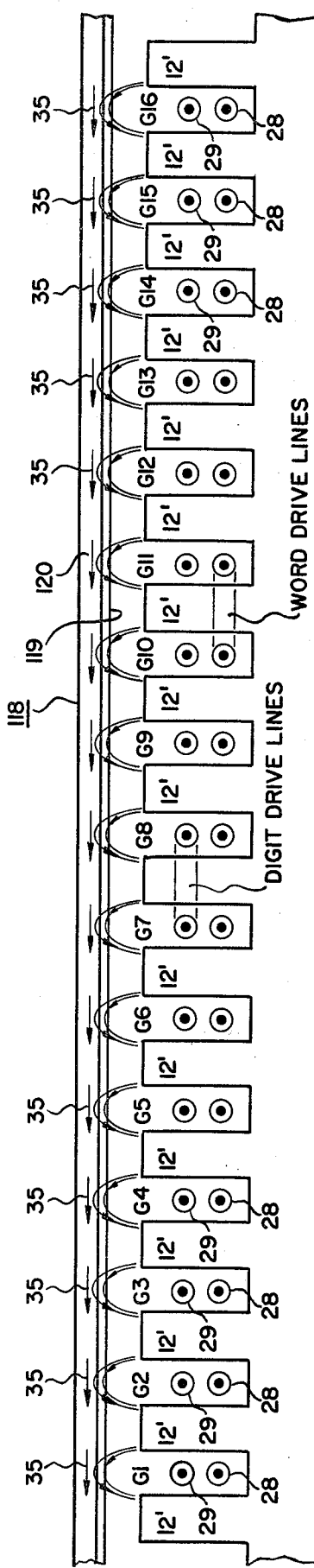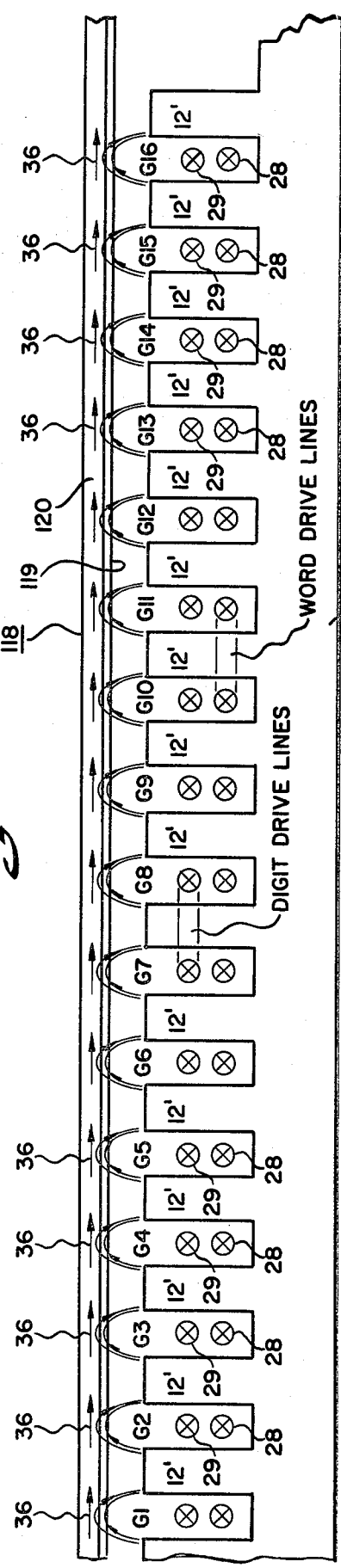
Fig. 13a
Fig. 13b
Fig. 13c

HIGH RESOLUTION MAGNETIC PRINTING HEAD

BACKGROUND OF THE INVENTION

This is a continuation-in-part of application Ser. No. 069,833 filed Aug. 27, 1979 and assigned to this instant assignee and now abandoned.

This invention relates to transverse magnetic printing heads and in particular to a high resolution magnetic printing head structure in which a pair of high permeability comb members are relatively offset to provide higher spatial resolution.

Magnetic printing is an extremely attractive alternative for computer and data communication applications, particularly in comparison to impact printing methods or to ink jet printing methods. Magnetic printing is quiet, rapid, and extremely flexible in the range of data which may be displayed. Magnetic printers may be employed to produce or reproduce alphanumeric, graphical, or pictorial data. In contrast, high speed impact printers are usually limited to a fixed character set employing a fixed chain, or a metal or plastic plug.

A detailed description of magnetic printing may be found in U.S. Pat. No. 4,097,871 issued to Berkowitz et al, assigned to the same assignee as the present invention, and which is incorporated herein by reference. It is to be particularly noted, however, that in a transverse magnetic printing head, the direction of orientation of the magnetic field impressed on the recording medium is perpendicular to the direction of movement of the medium.

Magnetic printing involves the transfer of a dry magnetic ink image from a ferromagnetic recording medium to a permanent paper medium. To produce the magnetic image on the recording medium, which attracts the magnetic ink from a reservoir to the magnetic recording medium in a transverse magnetic printing system, a long comb structure is provided which is oriented in a direction perpendicular to the direction of travel of the magnetic recording medium. The comb itself is composed of material having high magnetic permeability, thereby facilitating concentration of lines of magnetic flux at the tips of the teeth of the comb. Typically, a plurality of current-carrying conductors is threaded through each of the gaps in between the comb teeth and the current in these conductors controls the level of magnetic flux at the tips of the comb teeth. These current-carrying conductors may be driven independently, but typically and preferably are configured so as to be driven using coincident current matrix methods. The region of increased magnetic flux at the comb teeth tips is positioned near to the magnetic recording medium to permit the selective magnetization of regions in the medium, which regions thereafter attract the magnetic ink. In this manner, the currents and conductors threaded through the teeth of the comb control patterning of the magnetic ink on the ferromagnetic recording medium. The ink pattern is transferred to a paper medium to which the pattern is permanently affixed. The pattern from the magnetic recording medium is subsequently magnetically erased prior to the recording of new information thereon.

To achieve high resolution printing, the teeth of the comb must be spaced relatively close together. For example, the teeth of the comb may be spaced apart to form approximately 120 gaps per inch, which provides for only a 4 mil spacing between adjacent teeth. A magnetic printing head structure capable of this high resolution printing is seen, for example, in application Ser. No. 193,398 filed Oct. 2, 1980, which is assigned to the same assignee as the present invention and in which the inventor herein is a co-inventor. The above-referenced application describes a magnetic printing head structure (described hereinafter in greater detail) in which a single, high permeability, magnetic comb structure is disposed through elongated slots in a support member which may comprise one or more flexible printed circuit boards. In an embodiment employing two such flexible printed circuit boards, one of the printed circuit boards carries word line conductors while the other carries digit line conductors, permitting the printing head to be operable in a coincident current mode. The magnetic comb structure is disposed through slots in the printed circuit boards so that the electrical conductors disposed thereon typically cross the elongated slots at an angle of approximately 90° relative to the long dimension of the slot. The conductive printed leads carry the current to magnetically energize selected gaps in the comb. The resulting magnetic flux bridging the selected gaps acts to magnetize, in a transverse fashion, a small portion of the magnetic medium. Because of the extremely small size of the comb gaps and the electrical conductors which must be threaded through each gap, the resolution of such a magnetic printing head is limited.

Nonetheless, higher print resolutions are desirable to increase the readability and appearance of the printed data. Print resolutions as high as 200 or 250 dots per inch appear to be required for print quality comparable to that of the typewritten or conventionally printed material. In addition to these requirements, it is also highly desirable that the printing head be driven in a coincident current matrix fashion as described in earlier mentioned U.S. Pat. No. 4,097,871 and as further described herein. The economies of such a gap selection method are best appreciated by an example. If a 14 inch paper width is employed, then even at relatively low resolution of 120 gaps per inch, there is required a total of 1,680 gaps. This is not an unreasonable number of gaps but the magnetic printing head is significantly easier to assemble if automatic printed circuit methods are employed for the fabrication of the conductive leads. However, if each gap were to be driven individually, then 1,680 lines would have to be terminated on the circuit board and a suitable edge connector would have to be provided. This problem is even more pronounced at higher print resolutions. However, by employing coincident current techniques and digit and word line patterns, a pair of printed circuit boards may be employed with each circuit board having only 40 or 42 lines which must be terminated in an edge connector.

In the coincident drive system the gaps are grouped in adjacent segments referred to as "words". Each word contains an equal number of "digits", each digit being represented by a single gap. Each gap is threaded with a word drive line and a digit drive line. Individually, the word and digit lines carry only a portion of the current necessary to achieve adequate magnetization in the recording medium. To produce magnetic flux of sufficient magnitude to magnetize a region on the recording medium, a coincidence of a current pulse on each of the digit drive line and the word drive line through a gap is required. Of necessity, the current directions in these two separate drive line segments must be the same, otherwise each will cancel the effect of the other, thereby failing to produce the desired magnetization.

SUMMARY OF THE INVENTION

In accordance with a preferred embodiment of the present invention, a high resolution magnetic printing head comprises two sub-assemblies. Each sub-assembly comprises a high permeability magnetic comb structure disposed through a pair of aligned slots in overlaid, flexible printed circuit boards. The circuit boards have printed thereon electrically conductive leads crossing elongated slots in the printed circuit boards at substantially right angles. The comb structure and conductors are electrically insulated. Additionally, because a flexible printed circuit board is employed, the board may be folded at an approximately 90° angle in a fold line substantially following the line of the elongated slot in the circuit board. The printed circuit board is preferably adhesively fixed in place on an anodized aluminum supporting member. A second sub-assembly substantially identical to the first sub-assembly is then adjacently disposed so as to place the respective magnetic comb structures as close together as possible and so that all of said comb teeth in both sub-assemblies are oriented in the same direction. However, the comb structures are aligned so that the teeth of one comb in one sub-assembly are disposed opposite the gaps between the comb teeth in the other sub-assembly. In this fashion, the print resolution is doubled. The two sub-assemblies are preferably held together by any convenient mechanical structure which is then surrounded in a moldable composition forming an arched surface which is made flush with the tips of the comb teeth, (for example, by grinding) so as to provide a smooth, nonabrading printing head for placement in close contact with the magnetic recording medium.

Accordingly, it is an object of the present invention to provide a high resolution magnetic printing head which is easily assemblable using flexible printed circuit boards and high permeability magnetic comb structures.

Another object of the invention is to provide a high resolution magnetic printing head made up of two identical sub-assemblies disposed adjacent to each other so that the teeth on the respective magnetic comb structures of each sub-assembly point in the same direction, and wherein the teeth of one comb in one sub-assembly are disposed opposite the gaps between the comb teeth in the other sub-assembly.

It is still another object of the invention to provide a high resolution magnetic printing head in which the word and digit lines of each sub-assembly may be driven with bipolar word and digit drive currents to produce magnetized regions on the recording medium, wherein the polarity of each magnetized region is opposite to that of any adjacent region.

DESCRIPTION OF THE DRAWINGS

FIG. 5 illustrates the relationship between the digit windings, the teeth of the comb, and unipolar digit line drive winding current direction.

FIG. 6 illustrates the relationship between the word windings, the teeth of the comb structure, and unipolar word line drive current direction.

FIG. 9 is a side elevation view showing the relationship of the comb structure to the magnetic recording medium.

FIGS. 12a–12c are side elevation views of the comb sub-assembly structure and the magnetic recording medium illustrating unipolar word and digit line current direction as well as the direction of the magnetization of the recording medium.

FIGS. 13a–13c are side elevation views of the comb sub-assembly structure and the magnetic recording medium illustrating bipolar word and digit line current direction as well as the direction of magnetization of the recording medium.

DETAILED DESCRIPTION OF THE INVENTION

Figure 1:
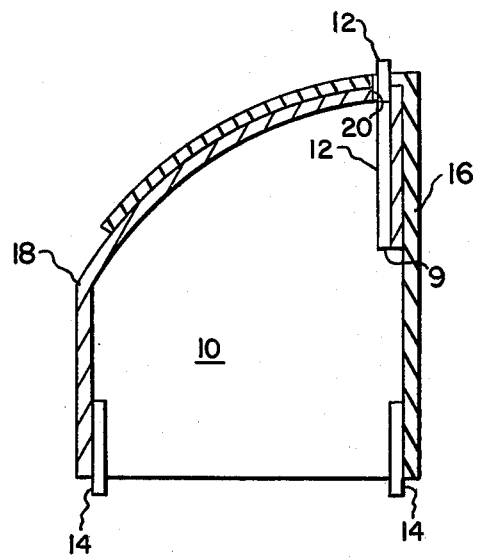
FIG. 1 is a partial cross-sectional side elevation view through one of the two sub-assemblies comprising the present magnetic printing head.

FIG. 1 illustrates one of the two sub-assemblies employed in the present invention. Magnetic comb structure 12 rests on a shoulder 9 of supporting member 10. Supporting member 10 preferably comprises a material such as anodized aluminum and provides support to the comb 12 and flexible printed circuit boards 16 and 18. Circuit board 18 has printed thereon electrically conductive circuit patterns forming electrically conductive word lines such as those illustrated in FIG. 6 and described hereinafter. Circuit boards 16 and 18 have an elongated slot 20 disposed therein through which the comb 12 is disposed. For clarity, the conductive patterns on the circuit boards are not shown. Flexible circuit board 16 with its conductive digit line patterns, such as those illustrated in FIG. 5, is preferably adhesively affixed to an arch surface of supporting member 10. Circuit board 16 is terminated along one edge thereof by a conventional circuit board edge connector 14. The other portion of circuit board 16 is preferably folded down against the comb and supporting member 10 along a fold line near the elongated slot 20. Circuit board 18, comprising a material similar to circuit board 16 is disposed with its elongated slot 20 aligned and in registration with the slot 20 and circuit board 16. Additionally, the conductive word lines present on board 18 are arranged so as to be parallel to the corresponding digit lines on circuit board 16. The teeth of the high permeability magnetic comb structure protrude through the spaces between these parallel word and digit lines. Flexible circuit board 18 is affixed to circuit board 16 along the arched portion of the supporting member 10 and folded at approximately a 90° angle in the vicinity of the elongated slot 20 in the board so that along with a portion of circuit board 16, a portion of circuit board 18 lies flat against a level surface of supporting member 10. Like circuit board 16, circuit board 18 is terminated in an edge connector 14, as shown in FIG. 1.

The longitudinal resolution achieved by the printing head is that resolution measured in a direction parallel to movement of the recording medium. Accordingly, improvement in resolution in this direction is effected by employing a different size magnetic comb structure. Instead of employing a comb structure which is 10 mils thick (that is, in a direction measured parallel to the direction of tape transport) comprising five layers, each having a thickness of 2 mils, a magnetic comb structure which is only 4 mils thick may be fabricated by employing two layers of comb material, each being 2 mils thick. This increases the longitudinal resolution to approximately 250 dots per inch. The comb material itself preferably comprises a nickel-iron alloy. The nickel-iron alloy exhibits high magnetic permeability. Moreover, electric discharge machining (EDM) may be employed to fabricate the magnetic combs employable in the present invention. If EDM is employed, the comb structure is preferably formed as a single layer. The single layer, (i.e., non-laminated) comb structure produced by EDM offers several advantages. The fact that it is a single structure eliminates the need for holding together the laminations with adhesives such as epoxy resins which are low temperature materials. While epoxy resins are certainly employable for this purpose, their use limits the choice of insulating materials. In the single layer comb structure though, insulating materials such as baked-on varnish may be employed to achieve a tougher insulating coat. Sputtered coatings such as alumina or silicon nitride may also be employed to insulate the non-laminated magnetic comb structure. The use of EDM also provides another significant advantage, in addition to greater flexibility in insulating materials. In particular, EDM may be employed to fabricate several magnetic combs at a time. These combs are machined in the same process step and therefore exhibit excellent uniformity of teeth spacing from comb to comb. Thus, when the teeth are offset in accordance with the present invention, print regularity is unaffected.

An important feature of the printed circuit board construction is illustrated in FIG. 5 (further described hereinafter). Digit line $d_1$ is wound (threaded) through the first gap in word 1 and the last gap in word 2, the first gap in word 3 and the last gap in word 4. Similarly, the second digit line $d_2$ is wound through the second gap in word 1 and the next-to-last in word 2, the second gap in word 3 and the next-to-last gap in word 4. The third digit line $d_3$ is wound through the third gap in word 1 and the third gap from the end in word 2, the third gap in word 3 and the third gap from the end in word 4. The fourth digit line is wound in a similar manner, as shown. In effect, the digit lines in alternate adjacent words are threaded through the gaps in a mirror image fashion. The advantage of this method is that it completely avoids crossovers and permits fabrication of planar flexible printed circuits for the digit drive lines of a transverse magnetic printing head. The small rectangular box such as 12′ in FIG. 5 represents the teeth of the comb structure which forms the gaps through which the digit windings pass.

In general, if the gaps are organized in a matrix structure with W words and D digits per word, then the digit line is threaded through the $i^{th}$ gap in half of the words in an alternating fashion, and through the $(D-i+1)^{th}$ gap in the remaining words, also in an alternating fashion. To be more specific, a digit line transversing the $j^{th}$ gap in alternate words, traverses the $(D-j+1)^{th}$ gap in the remaining alternate words. The gaps within any word are labeled consistently from left-to-right or from right to left. For example, in a left to right labeling, gap $G_{11}$ in FIG. 5 is described as the third gap in word 3.

FIG. 6 illustrates the corresponding word lines for the digit drive lines in FIG. 5. Again, solely for clarity of description, as in FIG. 5, FIGS. 6, 10, and 11 deal with a magnetic recording head structure which is divided into four words, with each word also having four digits. More conventional structures would typically have 40 words with 40 digits per word, or perhaps 12 words with 20 digits per word. The structure of the word drive lines shown in FIG. 6 is relatively simple in comparison to the digit drive line configuration of FIG. 5. The word drive lines form a zig-zag pattern threading through adjacent gaps, each segment of four gaps forming a word. The planar nature of the word line circuit makes them readily manufacturable on a printed circuit medium. It is, however, the digit drive line structure that permits both the word and digit drive lines to be fabricated upon two printed circuit boards or even on both sides of a single printed circuit board.

Figure 7:
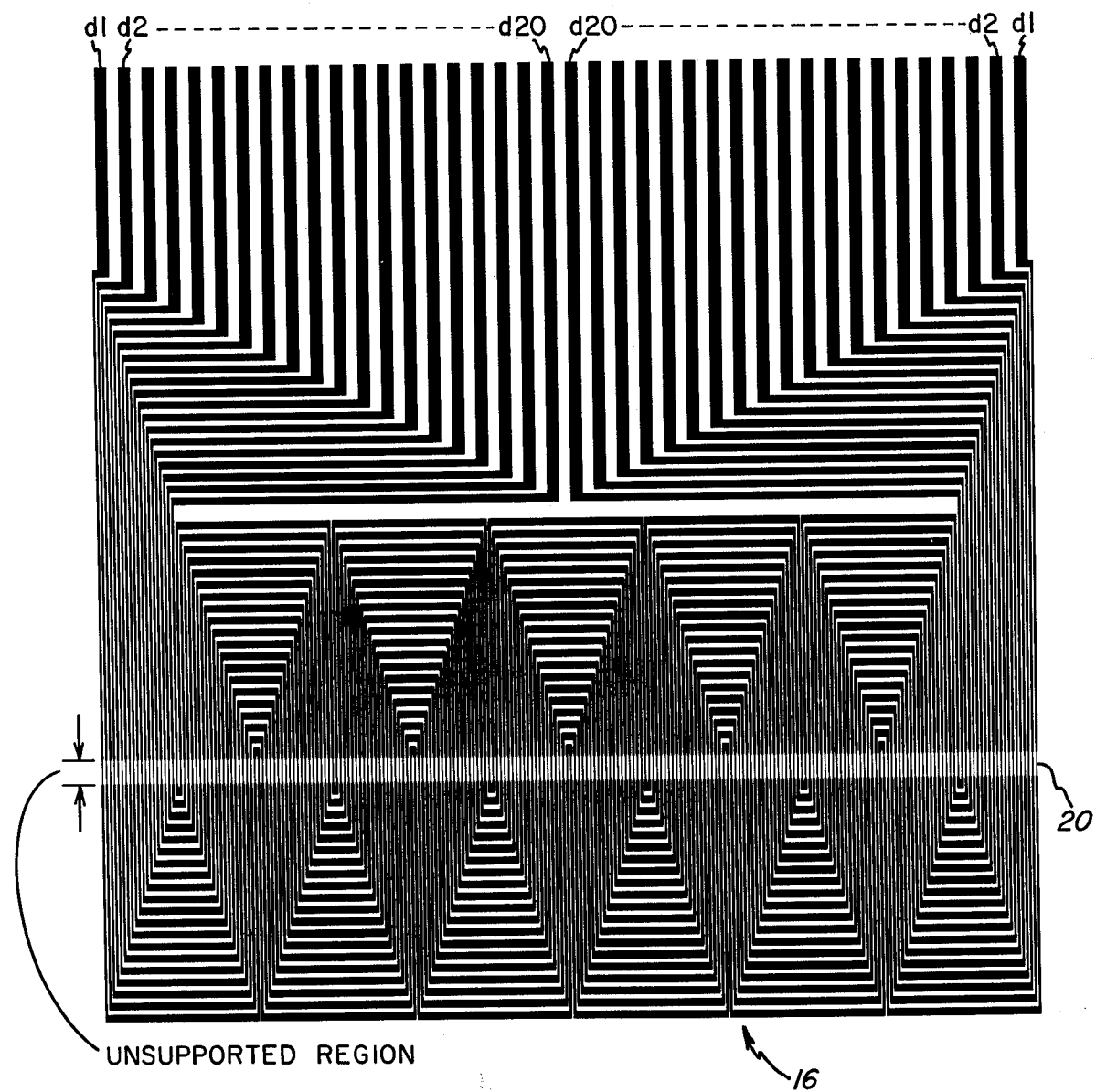
FIG. 7 is an enlarged photograph of a printed circuit wiring pattern for the digit line drivers for the case in which there are 20 digits per word.
Figure 8:
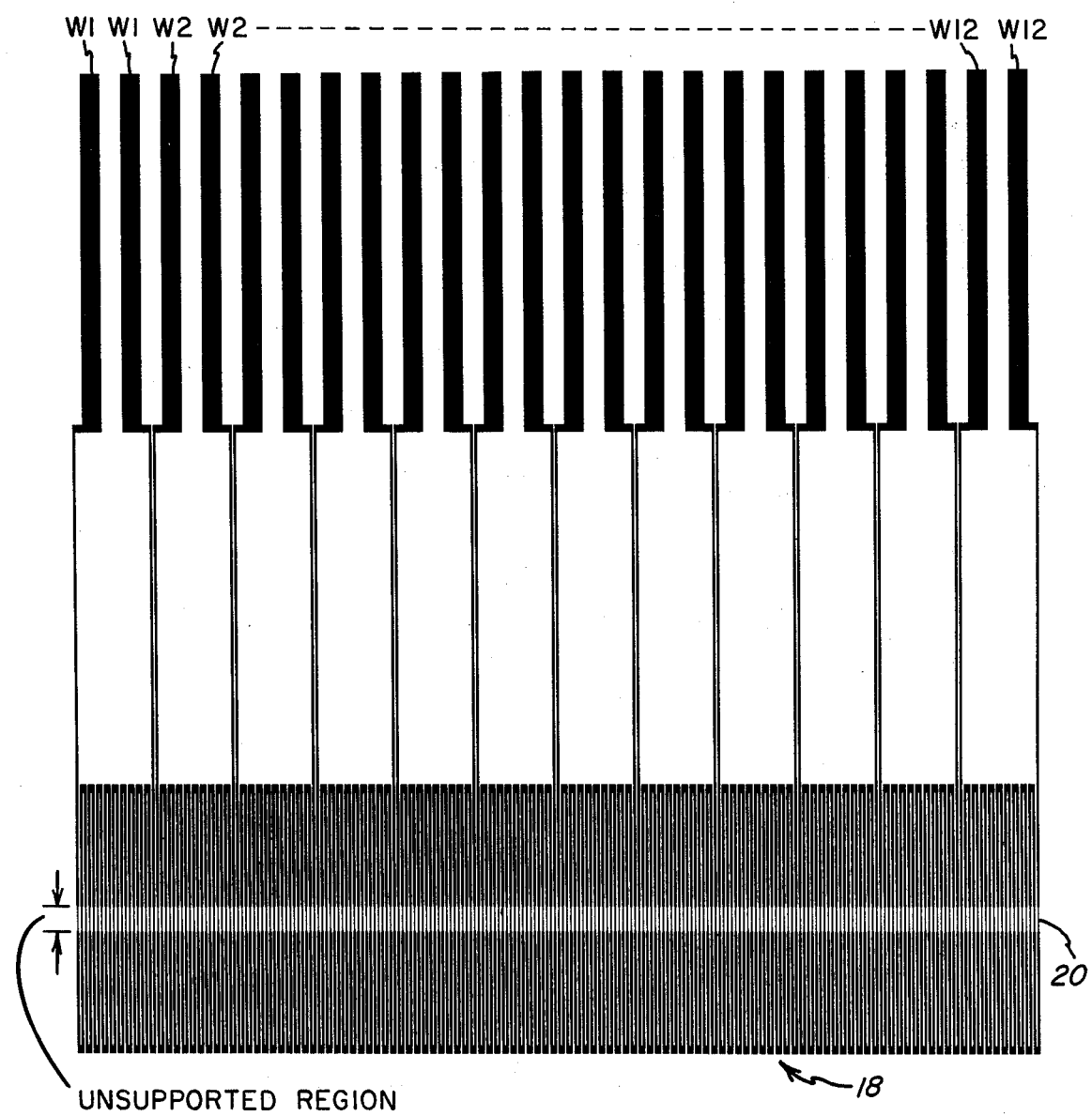
FIG. 8 is an enlarged photograph of the layout pattern for a printed circuit board illustrating the placement of the word line drive circuits for the situation in which there are 12 words and 20 digit lines per word.

FIG. 7 illustrates a printed circuit digit drive line pattern for a more practical situation than that illustrated in FIGS. 5, 6, and 10–13. In this case there are twelve words with 20 digits per word for a total count of 240 gaps or approximately a 2 inch wide printed line rather than the exemplary four word segments shown in FIGS. 5, 6, 10 and 11. The corresponding word line drive patterns are illustrated in FIG. 8. While a 2 inch wide line may be practicable for certain applications, the primary utility for such a small segment is in a modularly structured magnetic printing head containing, for example, seven of these modular units for a total and more typical line width of 14 inches.

As illustrated in FIGS. 7 and 8, there is a required gap 20 in the printed circuit boards 16 and 20 through which the comb structure 12 protrudes. This requirement of an unsupported gap region in the printed circuit board (but not in the conductive wiring) necessitates a modified printed circuit fabrication process.

Apart from the presence of the gap in the supporting printed circuit substrate, the fabrication of the printed circuit wiring is accomplished by standard photoetching processes. A thin, top conductive sheet, typically approximately 2 mils thick, is bonded to a flexible insulated supporting substrate such as Kapton ®, Mylar ®, photoresist, or anodized aluminum. If a single printed circuit board with the word drive lines and the digit drive lines on opposite sides is desired, a second copper sheet is bonded to the opposite side of the substrate. Then a thin layer of photoresist is applied to each side of the copper sheet or sheets which are then then exposed and developed. The copper sheets are next etched through to form the digit and/or word line circuit patterns. The printed circuit board is then thoroughly cleaned to remove any chemical residue and the circuit is electrically insulated particularly around the unsupported area. The insulation is accomplished by dipping or spraying insulating material such as nylon or epoxy or by by employing a special polymer process to be more particularly described hereinafter.

There are two basic methods for producing a printed circuit board with the required gap. First, the gap may be present initially in the insulating substrate, in which case the copper or other conductive sheet provides the necessary integrating structure to link the substrate portions disposed on either side of the gap. In this method, the usual photoresist and etching processes are employed, dissolving copper except in those areas where the wiring is desired, and forming a bridge of fine wires across the gap in the substrate. Second, the gap may also be formed by photoresist techniques, in which case the substrate is either an insulated metal or a photosensitive polymer material, either of which is selectively dissolvable upon immersion or application of appropriate etchants. In this second method of gap fabrication, it is preferred that an insulated metal substrate be used since it provides a greater degree of dimensional stability than is provided by photosensitive polymers.

Because of the small dimensional tolerances required in the completed magnetic printing head assembly, care and certain precautions are to be followed in the final assembly procedure. In particular, care must be taken to see that the comb, the word drive lines, and the digit drive lines are all insulated, each from the other. A strong insulation is required since the small fine edges present on the comb may otherwise scrape the insulation from the conductive windings during assembly. As indicated above, the insulation may be applied either by spraying or dipping processes. One possible insulating material that is usable, if desired, is Teflon ®. Another insulating material which provides the kind of protection needed in this application is the monomer Parylene ® (as supplied by Union Carbide, Inc.). Using this insulating material requires vaporization of the Parylene monomer. The printed circuit assembly is exposed to this vaporized monomer and the material polymerizes on contact with the conducting wires. Parylene is thus a preferred insulating material in this application not only because it forms an even conformal coating around each conductive line but also because it has lubricant qualities which facilitate assembly of the completed flexible printed circuits to the structure holding the comb.

Any conventional inert epoxy resin may be employed for adhesively affixing the printed circuit boards to each other or the supporting members, as shown in FIG. 1.

Figure 2:
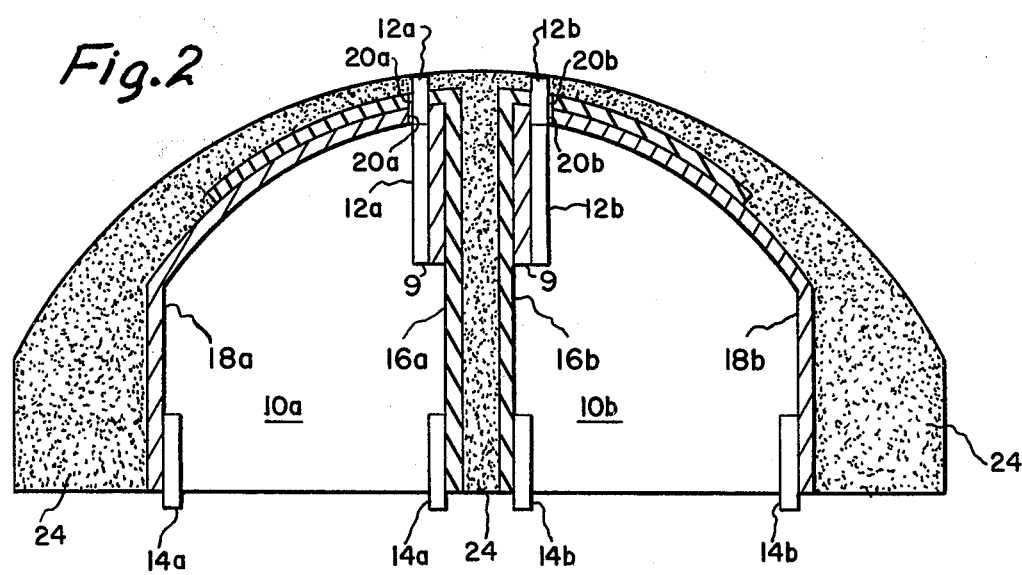
FIG. 2 is a partial cross-sectional side elevation view of two sub-assemblies configured to form a single high resolution magnetic printing head.

In order to increase the transverse resolution, that is, the resolution in a direction measured perpendicular to the direction of travel of the tape transfer medium, two sub-assemblies of the type shown in FIG. 1 may be employed. FIG. 2 shows such sub-assemblies employed in a single magnetic printing head. In FIG. 2 (and in FIGS. 3, 4, 12a-b, and 13a-b), the suffixes "a" and "b" are employed to designate the two separate sub-assemblies. However, each of these sub-assemblies are substantially the same. Sub-assemblies 10a and 10b are mechanically attached and enclosed within moldable compounds 24 to form the printing head. This compound preferably comprises a thermally conductive epoxy resin. The compound substantially conforms to the shape of the joined sub-assemblies and is particularly useful in forming a smoothly arched, nonabrasive surface which may be placed in close proximity to the traveling magnetic medium. The two sub-assemblies 10a and 10b are positioned as shown in FIG. 2 so that comb structures 12a and 12b are positioned as close together as practicable, said sub-assemblies being positioned as shown so that the comb structures are oriented in substantially the same direction.

Figure 3:
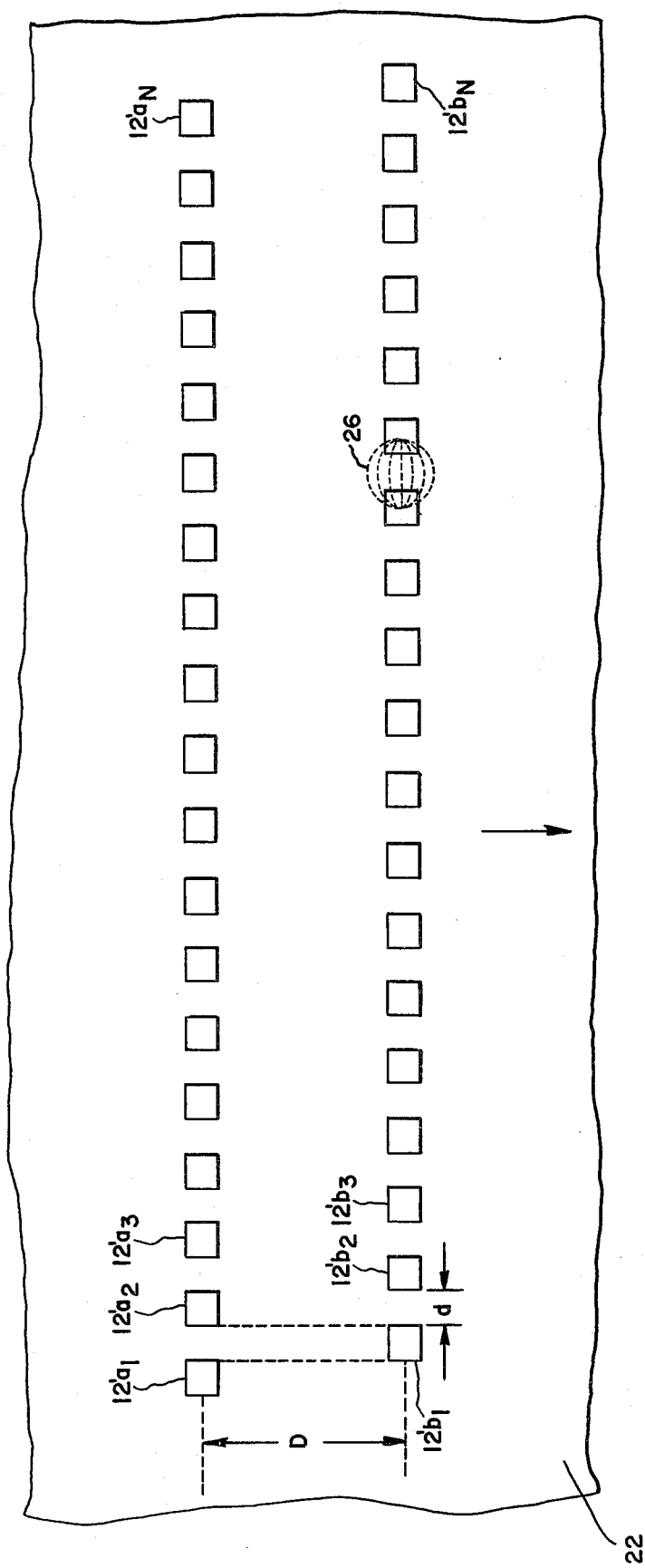
FIG. 3 is a top view illustrating the relative placement of the tips of the comb teeth with respect to the recording medium.

In particular, in the present invention, the comb structures of the two sub-assemblies are aligned opposite one another so that the teeth of comb structure 12a, for example, are disposed opposite the gaps in the teeth of comb structure 12b. This alignment is more particularly illustrated in FIG. 3 wherein a portion of the printing head is shown in contact with the magnetic recording medium 118 as it travels past the tips of the comb teeth 12' in the direction shown by the arrow. In this figure, the tips of the comb teeth for comb structure 12a are shown and designated $12a'_1$ through $12a'_N$. Likewise, a portion of the row of comb teeth tips for comb 12b are shown and designated $12b'_1$ through $12b'_N$. These parallel rows of comb teeth are separated by a distance D which typically is approximately 20 mils. The comb teeth themselves have gaps of approximately 4 mils. Significantly, the apparatus of FIG. 3 provides a doubling in transverse resolution because the teeth of comb structure 12b are aligned opposite the gaps in structure 12a. Because of the distance D between the comb structures and because of the finite velocity of the tape transport, a slight delay in the electrical signals provided to sub-assembly 10b is generally required to insure proper print registration. A simple delay mechanism having a delay of approximately a few milliseconds provides a sufficient remedy for this problem. In fact, this delay is preferably provided by a variable delay line and adjusted after final assembly of the entire magnetic printer to achieve the best match with the speed of the recording medium. Additionally, FIG. 3 also shows sample magnetic flux lines 26 for a selected gap in sub-assembly 10b.

FIG. 9 illustrates the relationship between the magnetic recording medium, the comb structure and the digit and word drive lines as structured in one sub-assembly 10 such as shown in FIG. 1. A magnetic recording medium 118 moves in a direction either into or out of the plane of the paper as shown in FIG. 9. The magnetic recording medium 118 is typically composed of a 0.7 to 0.8 mil backing material 119 such as Mylar to which is applied a coating of a ferromagnetic oxide 120. The comb 12 is typically composed of a material chosen for its high magnetic permeability, such as provided by certain nickel-iron alloys. The comb structure 12 has teeth 12' forming gaps which operate in the vicinity of the magnetic recording medium 118. Shown in FIG. 9 are typical gaps $G_1$ through $G_5$ in various states of activation. Also shown in FIG. 9 are the digit drive lines 29 and the word drive lines 28 threaded through each gap. This is not to suggest, however, that in FIG. 9 any or all of the word or digit drive lines must represent the same line.

Consider now the effect of the currents in the digit and word drive lines on the magnetic flux density between adjacent teeth. For example, in gap $G_1$ the dot in the center of each conductor indicates the presence of a respective current flowing in a direction out of the plane of the paper. The coincidence of these two currents is sufficient to produce a magnetic field 30a of sufficient strength to magnetize, in the direction indicated by the arrows, the corresponding portion of the magnetic recording medium 118. In gap $G_2$ an electric current flowing in a direction into the plane of the paper is indicated by the cross in the digit drive line conductor. Also in gap $G_2$, the absence of either symbol in the word drive line conductor indicates the lack of any current in that conductor. Thus, in gap $G_2$ the coincidence of currents is lacking and the magnetic field $30b$ bridging gap $G_2$ is of insufficient strength to cause magnetization of a corresponding region on the magnetic recording medium 118. In gap $G_3$, neither the digit nor word drive line has a current present, and thus produces no magnetic field and no magnetization on recording medium 118. In gap $G_4$, a current is indicated as flowing in the digit and word drive line conductors in a direction out of the plane of the paper. Since there is a coincidence of current, the magnetic field $30d$ bridging the gap is sufficient to cause magnetization of a corresponding region on magnetic recording medium 118 in the direction opposite to that at gap $G_1$. In gap $G_5$, there is no current present on the digit drive line and, therefore, any current on the word drive line, in either direction, is insufficient to cause magnetization of a region on the magnetic recording medium 118. In the typical operation of a magnetic printing system a plurality of word drive lines or digit drive lines are activated simultaneously in each printing head sub-assembly.

FIGS. 12a-12c illustrate the magnetic polarity (direction) of magnetized regions of the ferromagnetic oxide coating 120 of magnetic recording medium 118 when all of the word and digit lines 28 and 29, respectively, are simultaneously energized with unipolar drive currents. The purpose here is to describe the magnetic polarity relationships of the magnetized regions produced by adjacent gaps of a single magnetic head sub-assembly, as well as to describe a composite recorded pattern of magnetized regions produced by both sub-assemblies of the staggered magnetic head of the present invention. It is to be noted that although all of the word and digit lines are shown as energized, in actual practice the word and digit lines are selectively energized in timely sequence in accordance, for example, with the aforedescribed coincident current matrix techniques to reproduce the required information.

The unipolar drive currents for energizing digit lines 29 and word lines 28 in FIGS. 12a-12b are illustrated in FIGS. 5 and 6, respectively. The arrows superimposed on digit lines d1-d4 in FIG. 5 and word lines $W_1$-$W_4$ in FIG. 6 indicate the direction of drive currents in those portions of the word and digit lines disposed in gaps $G_1$-$G_{16}$ of magnetic head sub-assembly 10a shown in FIG. 12a. The digit and word lines are driven by currents applied at line ends E as shown in FIGS. 5 and 6, respectively. In this manner, digit lines $d_1$ and $d_3$ are driven in the same direction and digit lines $d_2$ and $d_4$ are driven by currents in the opposite direction. Word lines $W_1$-$W_4$ are all driven in the same direction.

As depicted in FIG. 12a, when viewed in cross section along section lines A—A in FIG. 5 and B—B in FIG. 6, the directions of drive currents in the portions of word and digit lines disposed in the gaps between comb teeth 12', are designated by a dot when the current flow is toward the observer and a cross when current flow is in the opposite direction. In FIG. 12a, drive current direction in the word and digit lines in any one given gap is in the same direction (coincident), but opposite to that on word and digit lines disposed in adjacent gaps. The coincident line currents in each gap produce magnetic flux fields $31a$ and $31b$ of sufficient magnitude to magnetize portions of magnetic recording medium 118. Since currents in adjacent gaps are opposite in direction, the magnetic fields associated with each gap are of opposite polarity as indicated by direction arrows in flux fields $31a$ and $31b$. Consequently, the magnetized areas of ferromagnetic coating 20 are also oppositely polarized, as depicted by arrows $32a$ and $32b$, respectively.

Sub-assembly 10b of the staggered magnetic head of the present invention is illustrated in FIG. 12b and is structurally substantially identical to sub-assembly 10a illustrated in FIG. 12a. Magnetic comb structure 12b is positioned so that the comb teeth 12' are aligned opposite the gaps in magnetic comb structure 12a. The word and digit lines 28 and 29, respectively, are however driven by currents which are opposite in direction to those illustrated in FIGS. 5 and 6, respectively. Thus, while the direction of currents in gap $G_1$ of sub-assembly 10a is toward the observer, the direction of currents in gap $G_1$ of sub-assembly 10b is away from the observer. The energizing of the lines of sub-assembly 10b is delayed with respect to those of sub-assembly 10a to permit recording medium 118 to travel the distance D (shown in FIG. 3) from sub-assembly 10a to sub-assembly 10b. The directions of magnetization of the ferromagnetic coating 12a is shown by flux arrows $33a$ and $33b$.

A composite recorded pattern of the two sub-assemblies is shown in FIG. 12c. The pattern comprises two adjacent magnetized regions $32a$ and $33b$ of the same magnetic polarity, followed by two adjacent regions $32b$ and $33b$ of the same polarity with respect to each other, but opposite to the polarity of regions $32a$ and $33a$. If the direction of travel of the recording medium 118 is not aligned precisely orthogonal to magnetic comb teeth structures 12a and 12b of each sub-assembly 10a and 10b, respectively, the magnetized regions having identical magnetic polarities such as $32a$-$33a$ and $32b14$ $33b$ may merge to produce a single larger magnetized region, rather than the desired two smaller regions. Such merger of magnetized regions is undesirable since it tends to reduce resolution due to the fact that merger results in 120 large dots per inch, rather than 240 smaller dots per inch. Another approach to reducing the possibility of dot mergers is to reduce the size of the gaps. This has the effect of creating more localized, discrete magnetized regions which are less likely to merge.

A "bipolar" technique for driving word and digit lines of each sub-assembly may also be advantageously employed to reduce the incidence of mergers of the magnetized regions. Generally, this technique requires that the direction of the word and digit line drive currents in the gaps of each sub-assembly be such that adjacent magnetized regions are of opposite magnetic polarity with respect to each other.

Figure 10:
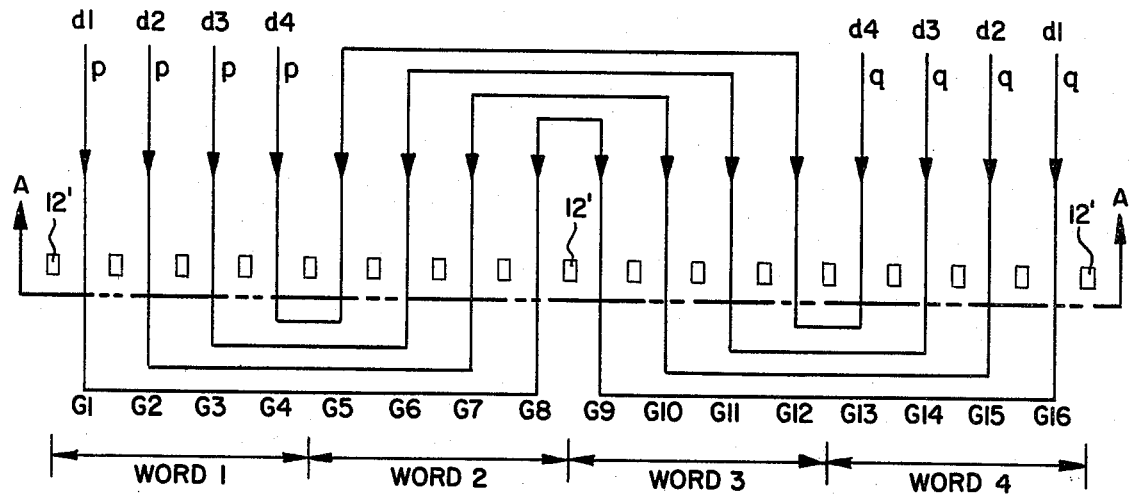
FIG. 10 illustrates the relationship between the digit windings the teeth of the comb, and bipolar digit line drive winding current direction.
Figure 11:
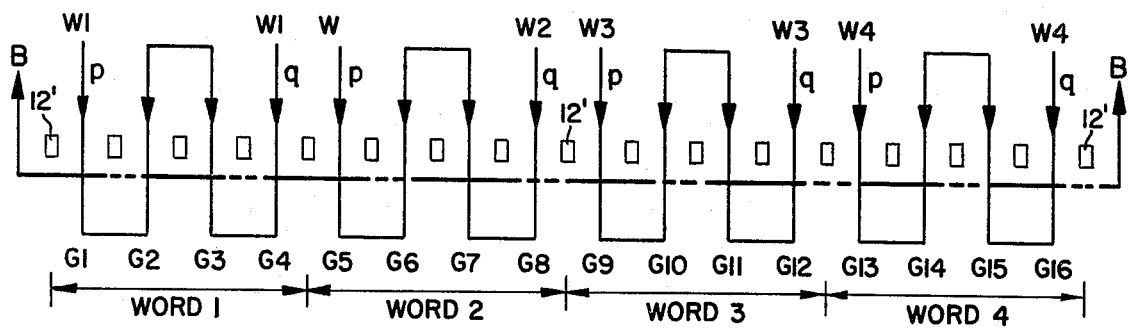
FIG. 11 illustrates the relationship between the word windings, the teeth of the comb structure, and bipolar word line drive current direction.

FIGS. 10 and 11 illustrate drive current directions in a bipolar drive. Although, again, for clarity of description, all the gaps in FIGS. 13a and 13b are shown as being energized, in actual practice the word and digit lines of each sub-assembly are selectively energized in timely sequence to reproduce the required information. Corresponding cross-sectional views along lines A—A and B—B of FIGS. 10 and 11 are shown in FIGS. 13a and 13b, respectively. Drive current directions illustrated in FIGS. 10 and 11 produce coincident currents in word and digit lines disposed in each gap of sub-assembly 10a in a direction toward the observer as depicted in FIG. 13a. In the bipolar current drive, digit lines $d_1$-$d_4$ and word lines $W_1$-$W_4$ may be selectively energized at either end p or q as shown in FIGS. 10 and 11, respectively, rather than from the single end E as in the unipolar drive shown in FIGS. 5 and 6. The resulting magnetized areas, designated by arrows 35 in FIG. 13a, are of identical magnetic polarity. Reversing the drive current directions indicated by the arrows in FIGS. 10 and 11 produces drive currents flowing away from the observer, as shown in FIG. 13b, and results in unidirectionally polarized magnetized regions, designated by arrows 36 in FIG. 13b, which are of a polarity opposite to that indicated by arrows 35 shown in FIG. 13a.

A composite recorded pattern produced by sub-assemblies 10a and 10b, energized as shown in FIGS. 13a and 13b, is depicted in FIG. 13c. The pattern comprises adjacent magnetized areas 35 and 36 which are of opposite polarities, as indicated by the oppositely pointed arrows. Such polarity configuration has the effect of minimizing the possibility of adjacent magnetized regions merging into larger, resolution-degrading regions. Of course, proper alignment of the recording medium 118 with respect to the magnetic comb structures is still desirable.

It should be noted that the composite recording patterns illustrated in FIGS. 12c and 13c are exemplary. Thus, while in FIGS. 12c and 13c the recording pattern begins with magnetized areas designated by arrows 33b and 36, respectively, directed from left to right, it could have just as effectively begun with magnetized areas of opposite polarity. It can be seen, for example, that if the word and digit lines 28 and 29 in sub-assembly 10a, illustrated in FIG. 13a, were energized by drive currents directed away from the observer, and if the word and digit lines of sub-assembly 10b, illustrated in FIG. 13b, were energized by drive currents directed toward the observer, the direction of the magnetized areas designated by arrows 35 and 36 would have been reversed. However, the composite recorded pattern would still comprise adjacent magnetized areas which are of opposite polarity. Therefore, it is the relative direction of the magnetized areas in the composite recorded pattern that is important.

Figure 4:
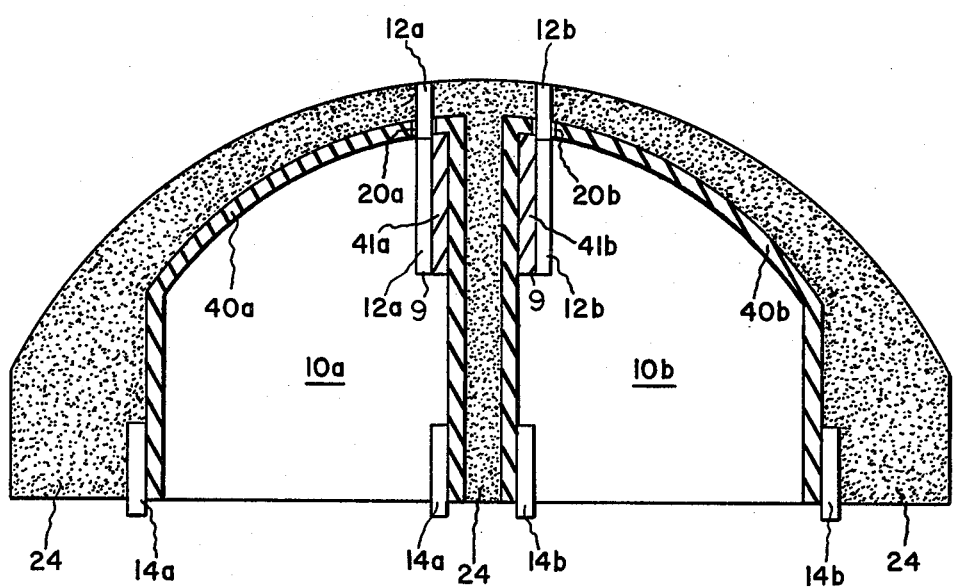
FIG. 4 is a partial cross-sectional side elevation view of a magnetic printing head employing a single flexible printed circuit board.

The magnetic printing head of the present invention may also be fabricated using a single flexible printed circuit board. In particular, FIG. 4 shows the cross section of such a printing head in which the word and digit line conductors are disposed on opposite sides of flexible circuit boards 40a and 40b in the two sub-assemblies. Spacers 41a and 41b may also be employed, if convenient, to facilitate bending along the elongated slots. Otherwise, the printing head of FIG. 4 is similar to the printing head shown in FIG. 2.

The double density printing head assembly of the present invention is also electronically addressable as a single integrated printing head array. For example, the digit lines of one sub-assembly may be connected to a corresponding digit line of the other sub-assembly and addressed by a common digit driver circuit. The two word line circuits may also be addressed by a common word driver matrix. Such addressing methods may be employed to reduce the number of driver circuits. However, the increase in series impedance generally requires an increased power level, thus requiring more sophisticated drive circuitry. Nonetheless, the magnetic printing head of the present invention readily permits these tradeoffs to be made.

From the foregoing, it may be appreciated that the present invention provides a high resolution magnetic printing head which is easily assemblable using flexible printed circuit boards and high permeability magnetic comb structures. The magnetic printing head is formed from two identical sub-assemblies disposed adjacent to each other so that the teeth on the respective magnetic comb structures of each sub-assembly point in the same direction, and wherein the teeth of one comb in one sub-assembly are disposed opposite the gaps between the comb teeth in the other sub-assembly, providing greater print resolution than is otherwise obtained. The word and digit lines in each sub-assembly may be driven with bipolar word and digit drive currents to produce magnetized regions on the recording medium, wherein the polarity of each magnetized region is opposite to that of any adjacent region, minimizing the possibility of resolution-degrading mergers. Since the printing head may fabricated from two identical sub-assemblies, manufacturing costs are significantly reduced. Because of the use of the flexible printed circuit board, the two magnetic comb structures may be placed as close together as 20 mils.

For printing heads having a length of only a few inches, it it becomes significantly more practical to employ sub-assemblies having only one set of drive lines mounted on a single flexible printed circuit board. Because the required number of conductive lines is reduced in this situation, the coincident current matrix driving mechanism need not be employed. Moreover, the word and digit lines for a matrix driven head may be printed on the same printed circuit board, the digit lines on one side of the board and the word lines on the other side.

While the invention has been described with reference to particular embodiments and examples, other modifications and variations will occur to those skilled in the art in view of the above teachings. Accordingly, it should be understood that within the scope of the appended claims, the invention may be practiced otherwise than is specifically described.

The invention claimed is:
1. A magnetic printing head comprising:
   (A) a first sub-assembly including;
      a high magnetic permeability, insulated toothed comb;
      a first support means having an elongated slot therein with electrically conductive word drive lines mounted thereon so as to cross said slot and
      a second support means having an elongated slot therein with electrically conductive digit drive lines mounted thereon to cross said slot, said word and digit drive lines being substantially parallel in the vicinity of said slots and said slots in said first and second support means being aligned so that the teeth of said comb protrude through the elongated slots and so that a word and a digit drive line passes through the gaps between the teeth of the comb; and
   (B) a second sub-assembly substantially the same as said first sub-assembly, said first and second sub-assemblies being fixedly positioned so that said comb structures are adjacently disposed and so that said comb teeth are aligned in parallel but with said teeth being offset so that the teeth of the comb in the first sub-assembly align opposite the gaps in the comb of the second sub-assembly.

2. The magnetic printing head of claim 1 wherein in each sub-assembly the comb and the first and second support means are mounted on a rigid supporting member.

3. The magnetic printing head of claim 2 in which said rigid supporting member comprises anodized aluminum.

4. The magnetic printing head of claim 1 further including a moldable composition covering the printing head in the vicinity of said comb teeth, so that the tips of said comb teeth are flush with said covering.

5. The magnetic printing head of claim 4 in which said moldable composition covering comprises a thermally conductive epoxy resin.

6. The magnetic printing head of claim 1 in which said first and second support means in each sub-assembly comprise first and second flexible printed circuit boards, respectively.

7. The magnetic printing head of claim 6 wherein in each sub-assembly said first and second flexible printed circuit boards comprise a single board in common and in which said electrically conductive digit and word drive lines are disposed on opposite sides of said board.

8. A magnetic printing head comprising:

(A) a first sub-assembly including:
 a high magnetic permeability, insulated toothed comb;
 a flexible printed circuit board having an elongated slot therein with electrically conductive drive lines mounted thereon so as to cross said slot, said drive lines being substantially orthogonal to said slot in the vicinity of said slot, the teeth of said comb protruding through the elongated slot so that each conductive drive line passes through a single gap between the teeth of said comb structure;

(B) a second sub-assembly substantially the same as said first sub-assembly, said first and second sub-assemblies being positioned so that said comb structures are adjacently disposed and so that said comb teeth are aligned parallel, said teeth being offset so that the teeth of the comb in the first sub-assembly align opposite the gaps in the comb of the second sub-assembly.

* * * * *